United States Patent
Buehler et al.

(10) Patent No.: US 8,977,969 B2
(45) Date of Patent: Mar. 10, 2015

(54) DYNAMIC WEB PORTAL PAGE

(75) Inventors: Dieter Buehler, Boeblingen (DE); Carsten Leue, Boeblingen (DE); Stefan Schmitt, Boeblingen (DE); Thomas Stober, Boeblingen (DE); Oliver Then, Boeblingen (DE); Steffen Uhlig, Boeblingen (DE); Holger Waterstrat, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 12/917,217

(22) Filed: Nov. 1, 2010

(65) Prior Publication Data
US 2011/0107233 A1   May 5, 2011

(30) Foreign Application Priority Data
Nov. 2, 2009   (EP) ...................... 09174794

(51) Int. Cl.
G06F 3/00    (2006.01)
G06F 17/30   (2006.01)

(52) U.S. Cl.
CPC .................................. G06F 17/3089 (2013.01)
USPC ............................ 715/747; 715/742; 715/738

(58) Field of Classification Search
USPC .......................................... 715/747, 742, 738
See application file for complete search history.

(56) References Cited

U.S. PATENT DOCUMENTS

| | | | |
|---|---|---|---|
| 6,691,106 B1 | 2/2004 | Sathyanarayan | |
| 6,832,263 B2 | 12/2004 | Polizzi et al. | |
| 7,058,014 B2 * | 6/2006 | Sim | 370/230 |
| 7,174,297 B2 | 2/2007 | Guerra et al. | |
| 7,330,890 B1 | 2/2008 | Partovi et al. | |
| 7,421,458 B1 * | 9/2008 | Taylor et al. | 1/1 |
| 7,448,078 B2 | 11/2008 | Daenen | |
| 7,499,948 B2 | 3/2009 | Smith et al. | |
| 7,533,142 B2 | 5/2009 | Ng et al. | |
| 7,890,571 B1 * | 2/2011 | Kriegsman et al. | 709/203 |
| 8,010,520 B2 * | 8/2011 | Naick et al. | 707/706 |

(Continued)

FOREIGN PATENT DOCUMENTS

WO    2008031646 A1   3/2008

OTHER PUBLICATIONS

Lee et al, "Building a human task-centric business process with WebSphere Process Server, Part 4: Portlet development", Jul. 30, 2007, pp. 1-15.*

(Continued)

*Primary Examiner* — Ryan Pitaro
(74) *Attorney, Agent, or Firm* — Steven L. Nichols; Van Cott, Bagley, Cornwall & McCarthy P.C.

(57) ABSTRACT

A system for providing a dynamic web portal page in a web portal environment by modifying the web portal page, where the system includes: a server configured to provide a content with at least one portlet of the web portal page to a user. The server enters code into the provided content of the web portal page for identifying user-interface elements in the content of the web portal page. The server enters code into the provided content of the web portal page for monitoring user actions related to the identified user-interface elements in the content of the web portal page. The server re-configures automatically the content of the web portal page according to a user-specific preference extracted from the monitored user actions for the user at a later stage.

17 Claims, 6 Drawing Sheets

(56) References Cited

U.S. PATENT DOCUMENTS

| | | | |
|---|---|---|---|
| 8,135,753 B2* | 3/2012 | Zhao | 707/797 |
| 2005/0065913 A1* | 3/2005 | Lillie et al. | 707/3 |
| 2005/0267869 A1* | 12/2005 | Horvitz et al. | 707/2 |
| 2006/0020596 A1 | 1/2006 | Liu et al. | |
| 2007/0209011 A1 | 9/2007 | Padmanabhuni et al. | |
| 2007/0266031 A1 | 11/2007 | Adams et al. | |
| 2008/0065762 A1* | 3/2008 | Nauerz et al. | 709/224 |
| 2008/0201242 A1 | 8/2008 | Minnis et al. | |
| 2009/0248486 A1 | 10/2009 | Gupta et al. | |
| 2010/0036933 A1* | 2/2010 | Breau et al. | 709/218 |
| 2010/0057639 A1* | 3/2010 | Schwarz et al. | 705/400 |
| 2010/0205541 A1 | 8/2010 | Rapaport et al. | |
| 2011/0029489 A1* | 2/2011 | Zhao | 707/648 |

OTHER PUBLICATIONS

Bansal, Bhawna; Design and Development Grid Portal; Computer Science and Engineering Department; Thapar Institute of Engineering & Technology, Patiala India; May 2005.

Held, Albert et al; Modeling of Context Information for Pervasive Computing Applications; Germany.

Major, Marshall S.; Enterprise Information Portal Overview Including Relevance and Technology Acceptance in a Small Professional Services Firm; a thesis for Master of Science in Management Information Systems; Boise State University; Oct. 2002.

Wootton, Jack; Supporting Teching of Grid Computing; University of Westminster; Oct. 18, 2006.

* cited by examiner

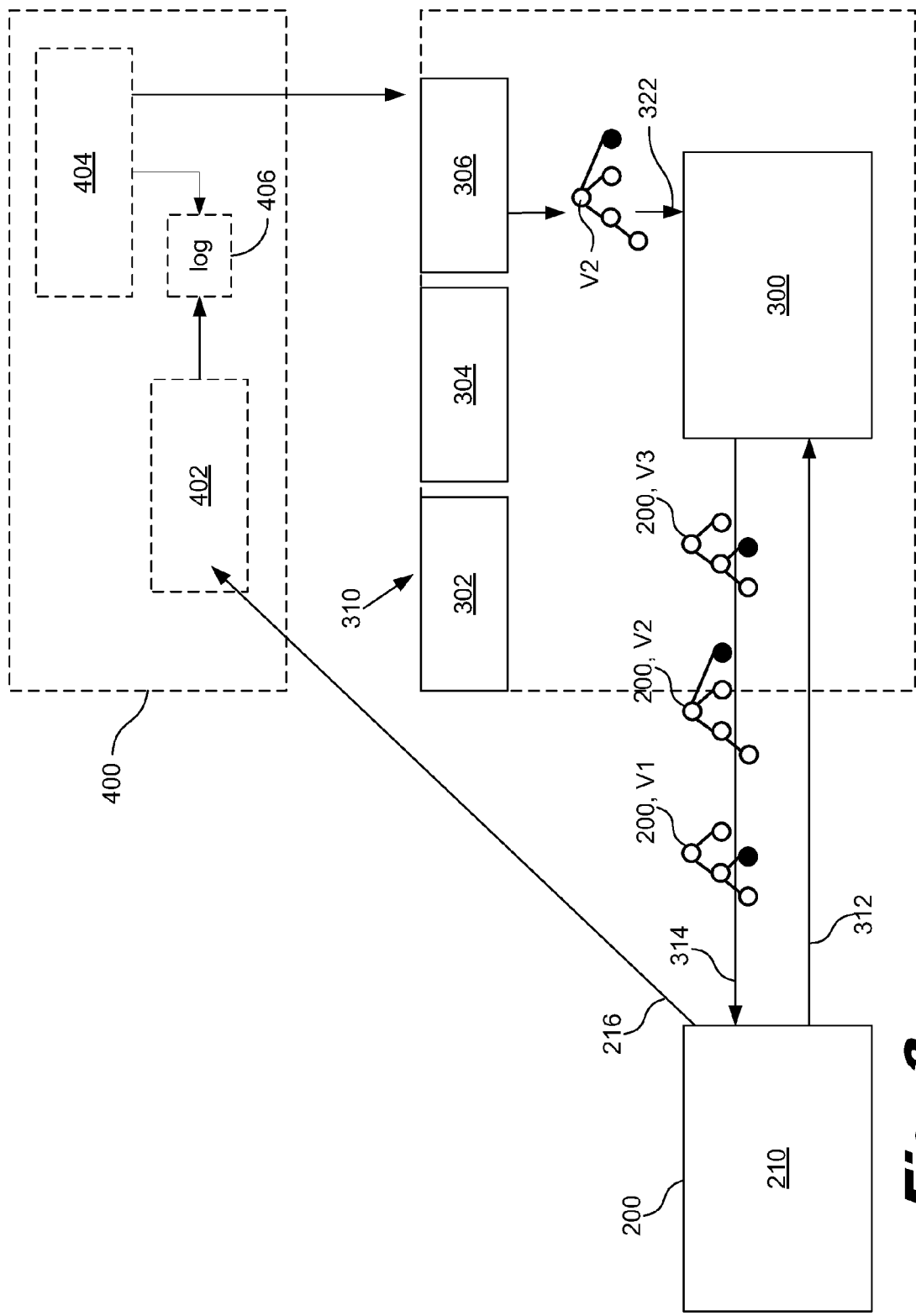

```
<div class="page-name" id="welcome">
```

```
<div class="portlet-window" id="tcwtvxgl6">
```

P1

```
</div>
```

```
<div class="portlet-window" id="mrpl1jad6">
```

P3

```
</div>
```

```
<div class="portlet-window" id="quu3xqnbh">
```

P2

```
</div>
```

```
<div class="portlet-window" id="pyy0wmj58">
```

P4

```
</div>
```

332

```
<script type="text/javascript">
dojo.forEach(portlets,
functions(portlet, I, portlets) {
    params += ...
}
);
body.innerHTML +=" <img src=" <img src="http://as.example.com/portlet?id=" +params +" />";
</script>
</div>
```

DYNAMIC WEB PORTAL PAGE

RELATED APPLICATION

Pursuant to 35 U.S.C. §119(b) and 37 C.F.R. §1.55(a), the present application corresponds to and claims the priority of European Patent Application No. 09174794.9 filed on Nov. 2, 2009, the disclosure of which is incorporated herein by the reference in its entirety.

BACKGROUND

The present application relates to the field of network computing and in particular to a method and system for designing a web portal or enterprise portal including a hierarchical structure of portal pages and portlets for accessing web content or enterprise content accessible via the web portal.

Web portals help to present to all users in a unified way a diverse amount of information on one web page. Typical web portals offer a variety of services such as, for example, e-mail, news, stock prices, weather, and entertainment, among others. Web portals, therefore offer a single web page that a user can access and thereby acquire a large amount of services and information in one place. A web portal is typically separated into web modules called portlets that separate sections of the web portal; each portlet representing at least one of the services or sources of information mentioned above. It is these portlets that the user or viewer of the web portal sees as blocks or sections within the web portal.

BRIEF SUMMARY

The present application discloses a method for providing a dynamic web portal page in a web portal environment by modifying the web portal page. The web portal page corresponds to a predetermined level in a navigation topology. The method includes, with a server, providing content with at least one portlet of the web portal page to a user. A code is entered from the server into the provided content of the web portal page for identifying user-interface elements in the content of the web portal page. Further code is entered from the server into the provided content of the web portal page for monitoring user actions related to the identified user-interface elements in the content of the web portal page. The content of the web portal page is re-configured automatically according to a user-specific preference extracted from the monitored user actions for the user at a later stage.

The present application further discloses a computer program product for providing a dynamic web portal page in a web portal environment, the computer program product includes a computer readable storage medium having computer readable program code embodied therewith. The computer readable program code may comprise computer readable program code configured to provide, via a server, a content with one or more portlets of the web portal page to a user; computer readable program code configured to enter code from the server for identifying user-interface elements in the content of the web portal page; computer readable program code configured to enter code from the server into the provided content of the web portal page for monitoring user actions related to the identified user-interface elements in the content of the web portal page; and computer readable program code configured to automatically re-configure the content of the web portal page according to a user-specific preference extracted from the monitored user actions for the user at a later stage.

The present application further discloses a system for providing a dynamic web portal page in a web portal environment by modifying the web portal page. The system may comprise a server configured to provide a content with at least one portlet of the web portal page to a user, in which the server enters code into the provided content of the web portal page for identifying user-interface elements in the content of the web portal page, in which the server enters code into the provided content of the web portal page for monitoring user actions related to the identified user-interface elements in the content of the web portal page; and in which the server re-configures automatically the content of the web portal page according to a user-specific preference extracted from the monitored user actions for the user at a later stage.

The present application further discloses a computer program product for providing a dynamic web portal page in a web portal environment, the computer program product comprising a computer readable storage medium having computer readable program code embodied therewith. The computer readable program code may comprise computer readable program code configured to provide, via a server, a content with one or more portlets of the web portal page to a user; computer readable program code configured to enter code from the server for identifying user-interface elements in the content of the web portal page; computer readable program code configured to enter code from the server into the provided content of the web portal page for monitoring user actions related to the identified user-interface elements in the content of the web portal page; and computer readable program code configured to automatically re-configure the content of the web portal page according to a user-specific preference extracted from the monitored user actions for the user at a later stage. The computer readable program code may further comprise computer readable program code configured to select and associate one or more variants of content of the web portal page for a specific user, in which the computer readable program code configured to select and associate one or more variants of content of the web portal page for a specific user further comprises computer readable program code configured to select the most successful variant of content permanently and disposing less successful variants; computer readable program code configured to associate a duration of viewing a portlet by the user to presenting of a specific portlet to the user; computer readable program code configured to associate a layout of the content to a specific user; computer readable program code configured to generate one or more tasks in a workflow process for human interaction, or combinations thereof.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 3 is an analytic feedback loop comprising a web portal server, a client, and a site-analytic service, according to one illustrative example of principles described herein.

FIG. 4 is an aggregation script, according to one illustrative example of principles described herein.

Throughout the drawings, identical reference numbers designate similar, but not necessarily identical, elements.

DETAILED DESCRIPTION

Figure 1:
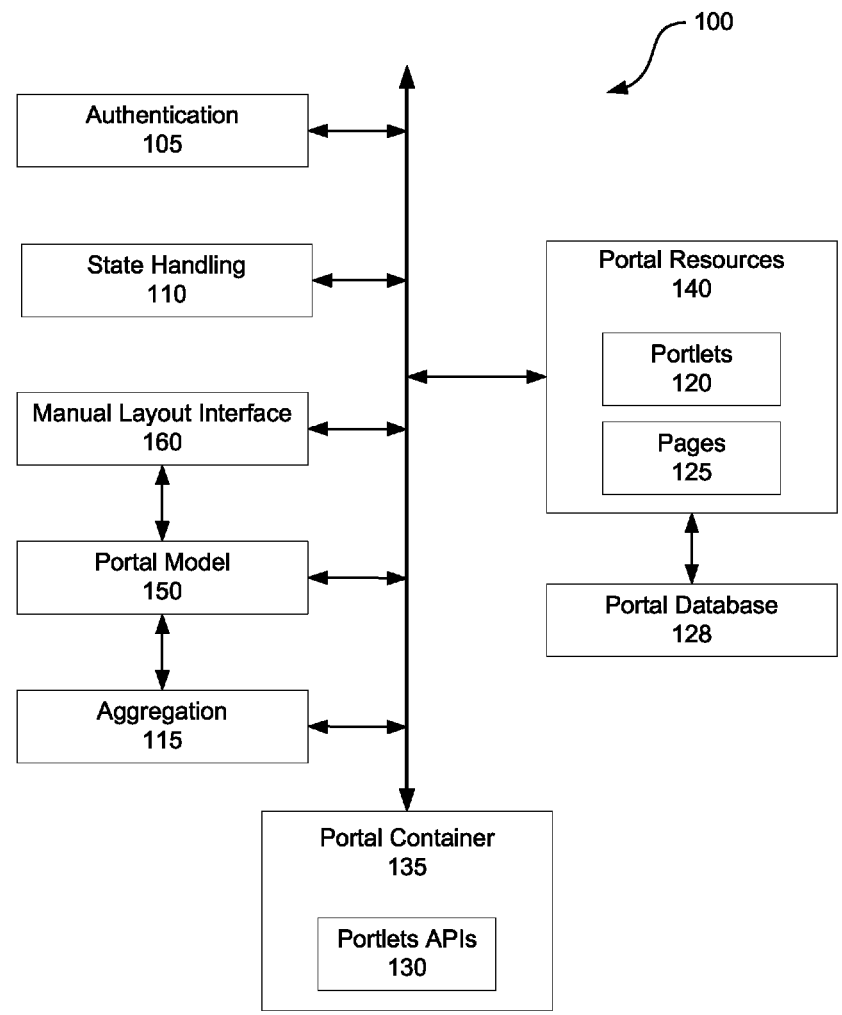
FIG. 1 is an illustrative portal server system, according to one embodiment of the prior art.

The present specification discloses a method, system and computer program product for providing a dynamic web portal page in a web portal environment by modifying the web portal page. The web portal page corresponds to a predetermined level in a navigation topology, and the web portal page displays a multitude of portlets.

Aspects of the present invention may be embodied as a system, method or computer program product. Accordingly, aspects of the present invention may take the form of an entirely hardware embodiment, an entirely software embodiment (including firmware, resident software, micro-code, among others) or an embodiment combining software and hardware aspects that may all generally be referred to herein as a "circuit," "module" or "system." Furthermore, aspects of the present invention may take the form of a computer program product embodied in one or more computer readable medium or mediums having computer readable program code embodied thereon.

Any combination of one or more computer readable medium or mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In the following description and in the appended claims, the term "flavor" is meant to be understood broadly as a user specific preference. For example, a flavor may specifically be variants of a web page portal with alternative user experience content or slightly modified content; a modified version of the default navigation tree presented in the web portal page (200) where the modification can be a different structure, different portlets or different metadata; or a complete new navigation model besides the current default navigation tree. Additionally, in the following description and in the appended claims, the term "user interface element" or "UI element" is meant to be understood broadly as any element in the web portal page where the user can give an input, can click on or interact in another way.

Still further, in the following description and in the appended claims, the term "theme" is meant to be understood as a decoration of a web page such as, for example, the color of the page, the structure of the page, the appearance of the page, amongst others. Similarly the term "skin" in the present description and in the appended claims is meant to be understood as a decoration of a portlet such as, for example, the color of the portlet, the structure of the portlet, the appearance of the portlet, amongst others.

Further, in the following description and in the appended claims, the term user-interface element is meant to be understood broadly as any element in a web portal page or portlet of a web portal page where a user can give an input, can click on, or otherwise interact with the web page portal.

FIG. 1 depicts a general portal server system that gives a schematic system view of a portal server implementing a web portal, such as, for example, a WEBSPHERE PORTAL® by International Business Machines (IBM) or a JETSPEED2 ENTERPRISE PORTAL by Apache Software Foundation (http://portals.apache.org/jetspeed-2/). Such a web portal may include complex functionality implemented on a network server, for example on a web server (100), significant elements of which are logic components for user authentication (105), state handling (110), aggregation (115) of fragments, a plurality of portlets (120) provided in respective pages (125) with a respective plurality of application programming interface (API) (130) to a respective portlet container software (135) for setting them into the common web page context, and some portal storage resources (140). The logic components of FIG. 1 are operatively connected such that data can be exchanged between single components as required. This is roughly depicted in FIG. 1.

In more detail, a portal engine of the web server (100) in FIG. 1 implements an aggregation of portlets (120) based on the underlying portal model (150) and portal information such as security settings, user roles, customization settings, and device capabilities. Within the rendered page, the portal automatically generates the appropriate set of navigation elements based on the portal model (150). The portal engine invokes portlets (120) during the aggregation as required and when required and may additionally use caching to reduce the number of requests made to the portlets (120). For example, the WEBSPHERE PORTAL® by International Business Machines (IBM) employs open standards such as the JAVA PORTLET API (application programming interface)® by Sun Microsystems, Incorporated. It also supports the use of a remote portlet (120) via the web services for remote portlets (WSRP) standard.

The portlet container (135) is a single control component competent for all portlets (120) that may control the execution of code residing in each of these portlets (120). It provides the runtime environment for the portlets (120) and facilities for event handling, inter-portlet (120) messaging, and access to portlet (120) instance and configuration data, among others.

The portal resources (140) are in particular the portlets (120) themselves and the pages (125), on which they are aggregated in the form of an aggregation of fragments. A portal database (128) stores the description of the portlets (120) featuring some attributes like portlet name, portlet description, portlet title, portlet short title, and keywords; and the portlet interaction interface description which is often stored in the form of web service description language (WSDL) documents. The portal database (128) also stores the portal content structure, for example, the hierarchical structure of portal pages which may again contain nested pages and portlets. This data is stored in the database (128) in an adequate representation based on conventional techniques such as relational tables.

The before-mentioned aggregation logic (115) includes all steps that are required to assemble a web page. Typically, these steps include loading a content structure from storage, traversing it, and calling the instances referenced in the structure in order to obtain their output which is assembled to a single page. The content structure may be defined through, for example, portlet customization by the administrator.

When web applications are visited by a web user, a navigation menu that provides some means to access underlying content is usually displayed to a user. A navigation menu is usually structured in a tree-like topology, and web users are forced to traverse the tree in order to reach a node matching the content the user is interested in. Specifically, web portals are equipped with such navigation menus that are used to navigate through all of the contents the web portal provides.

However, not every user is interested in the same content, and, therefore, the structure that is provided on any given portal may satisfy the needs of only a certain user group. For many individual users, however, the given topology does not satisfy their needs.

Figure 2:
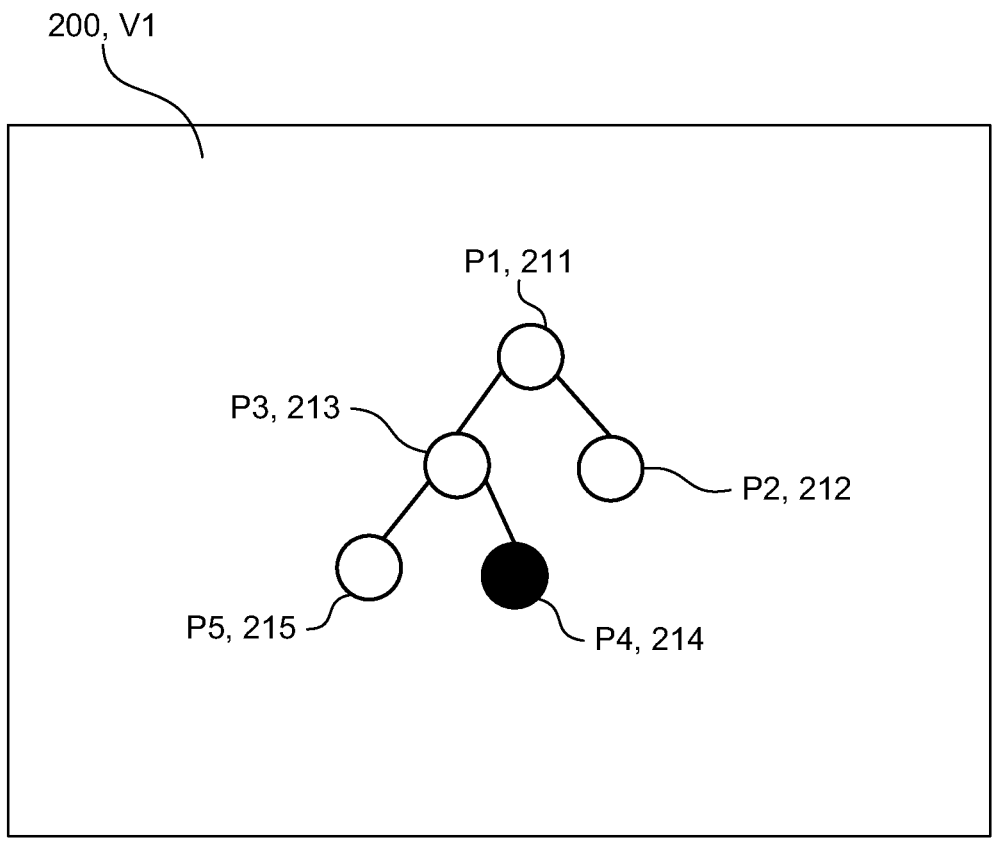
FIG. 2 is an example of a content of a web portal page with a variant of portlets, according to one illustrative example of principles described herein.

FIG. 2 illustrates, in a simplified form, an example of content of a web portal page (200) with a variant (V1) of portlets (P1, P2, P3, P4, P5) presented to a user. The portlets (P1, P2, P3, P4, P5) may, by way of example, be arranged at locations (211, 212, 213, 214, 215) of the web portal page (200).

An example embodiment of an analytic feedback loop comprising a web portal server (300), a client (210) displaying portal content of a web portal page (200) and a site-analytic service (400) is illustrated in FIG. 3. The portal content is expressed in different flavors, that are variants of the web portal page with alternative user experience content or slightly modified content. Different users may get exposed to different flavors. A flavor is to be understood as either (1) a modified version of the default navigation tree presented in the web portal page (200) where the modification can be a different structure, different portlets or different metadata, or (2) a complete new navigation model besides the current default navigation tree.

The web portal page (200) is modified so that a multitude of variants (V1, V2, V3) are presented to different users. According to one illustrative example, the variants (V1, V2, V3) of the web portal page (200) are equipped with a right set of infrastructure for web portal page analysis. For this purpose, a portal aggregation on the server side injects code into a produced variant (V1, V2, V3) of the web portal page (200), which can be used to identify and/or reference any relevant user-interface element (UI element). In a simple embodiment, an identifier is attached to each of the user-interface elements (UI elements). A user-interface element (UI element) is to be understood as an element in the web portal page where the user can give an input, click on an available option or interact in another way. An administration portlet could expose a user interface that allows the selection pages and user-interface elements (UI elements) within pages that would be of relevance.

The portal aggregation may also inject code that identifies the page elements that are subject to user actions, for example, user behavior. This code may be collected and aggregated by an analytics aggregator. The purpose of the analytics aggregator is to collect data about which user-interface elements (UI elements) are present on the page. After appropriated analysis, this may allow the tracking of a list of user actions or activities. This may be done by monitoring how often or how long one of the user-interface elements (UI elements) is viewed.

Once the web portal page (200) (or its variants (V1, V2, V3)) is closed, the list of user actions may be transferred directly to the configure site-analytics provider (400) via an output (216) of the client (210). The data and amount of evaluation may depend on the chosen site-analytics provider.

By way of example, an analysis of aggregated user actions may be performed on an analytics server (402) comprising analytics software (404) such as GOOGLE ANALYTICS® by Google Incorporated. The results may be returned to the web portal server (300) as a report to an input (322) of the web portal server (300). The web portal server (300) is taking action on the results to adapt the current user experience and apply the feedback retrieved from the analysis.

In a detailed scenario the browser client (210) requests a portal page (200) as indicated by a line (312). The web portal server (300) returns a web portal page markup as indicated by a line (314) including metadata markup (in a custom microformat) in form of a variant (V1, V2, V3) based on user attributes (302), decisions (304) and a rule engine (306) which are coupled to the server (300) or part of the web portal server (300). The browser client (210) aggregates metadata using the aggregator. Upon closure of the web portal page (200) the browser client (210) sends the collected information on the user actions on the web portal page (or one of its variants (V1, V2, V3)) to an analytics server (402) via, for example, HTTP GET. The site-analytics server (402) writes a report (406), for example, an access log. An analytics software package (404) analyzes the report (406) and sends it back to the web portal server (300).

There are different options available on how the web portal server (300) may take action on the results to adapt the current user experience and apply the feedback retrieved from the analysis. By way of example, as a first option, if in the analysis of the site-analytic service one of the flavors has proved to be most successful, for example a "purchase"-option has been chosen most often or, in the alternative, most quickly, the most successful flavor can be selected permanently and the other variants can be disposed. Alternatively, user characteristics or attributes can be considered and the user actions analyzed taking into account the user characteristics or attributes. As a result, specific flavors can be selected for specific user characteristics or attributes.

As a second option, portal personalization (310), such as user attributes (302), decisions (304), and rules engine (306), may have already defined rules taking into account parameters filled in by the analytics data from the report (406). For instance, if a viewing duration is long, a portlet may be presented with advertising information. Alternatively or additionally, if the viewing duration is short, a news ticker may be presented on the web portal page (200). Alternatively or additionally, the most frequently viewed portlets may always show on a main page of the web portal page (200).

As a third option, new personalization rules can be created automatically. For example, if the view duration is short for a specific user, the specific page may not be presented for that user again.

Still another option is that the general portal site layout can be manipulated, for example, by generating suitable scripts such as XMLACCESS® XML scripts International Business Machines (IBM), which place the most frequently viewed pages to "myFavorites" or other convenient places.

A further option may be generating tasks in a workflow process which ask for human interaction of a portal designer. The task may be viewed in a task portlet, such as, for example, those provided by WEBSPHERE PORTAL® by International Business Machines (IBM). The above described options may be selected as single options or may be selected as a combination of two or more options.

FIG. 4 displays an example of an aggregation script in a micro-format (332) for four portlets (P1, P2, P3, P4) injected in the web portlet page (200) for monitoring the user actions on the web portal page (200) with a custom-provided aggregator (330). Additionally, FIG. 5 displays an example of the web portal server (300) displayed in FIG. 4 to which is coupled an engine (330) for building a model based on a flavor filter as well as a metrics engine (350) and a repository (340) for variants of contents of the web portal page (200). The engine (330) sends information, as indicated by a line (332), to the metrics engine (350) for determining the flavor for the requested page and receives a flavor filter, as indicated by line (334), from the metrics engine (350). The metrics engine (350) provides the flavor filter based on flavor configuration from the repository (340).

The flavor filter selects one out of many different flavors or variations of a particular website. The selected flavor may be used as the flavor of a given page which may also be used and sent to a user. The choice of a flavor can be tailored by configuration, for example, by reserving a set of flavors for a particular user group only.

Figure 5:
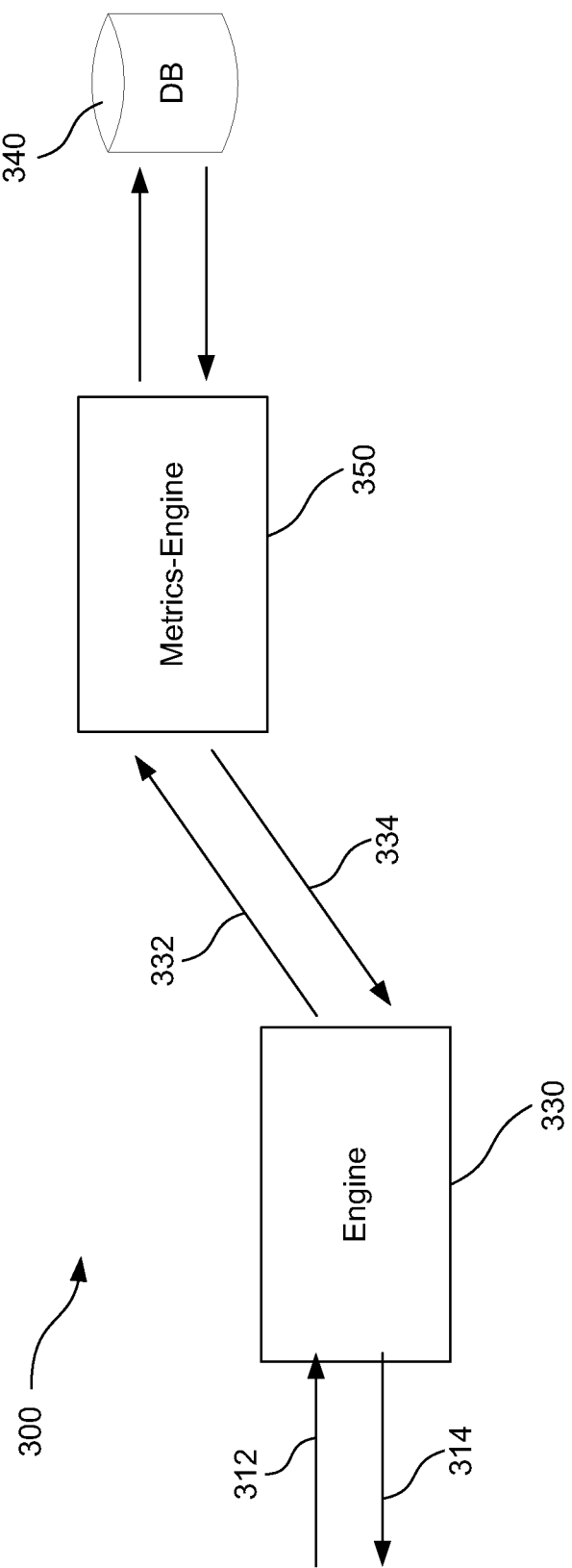
FIG. 5 is a web portal server according to one illustrative example of principles described herein.
Figure 6:
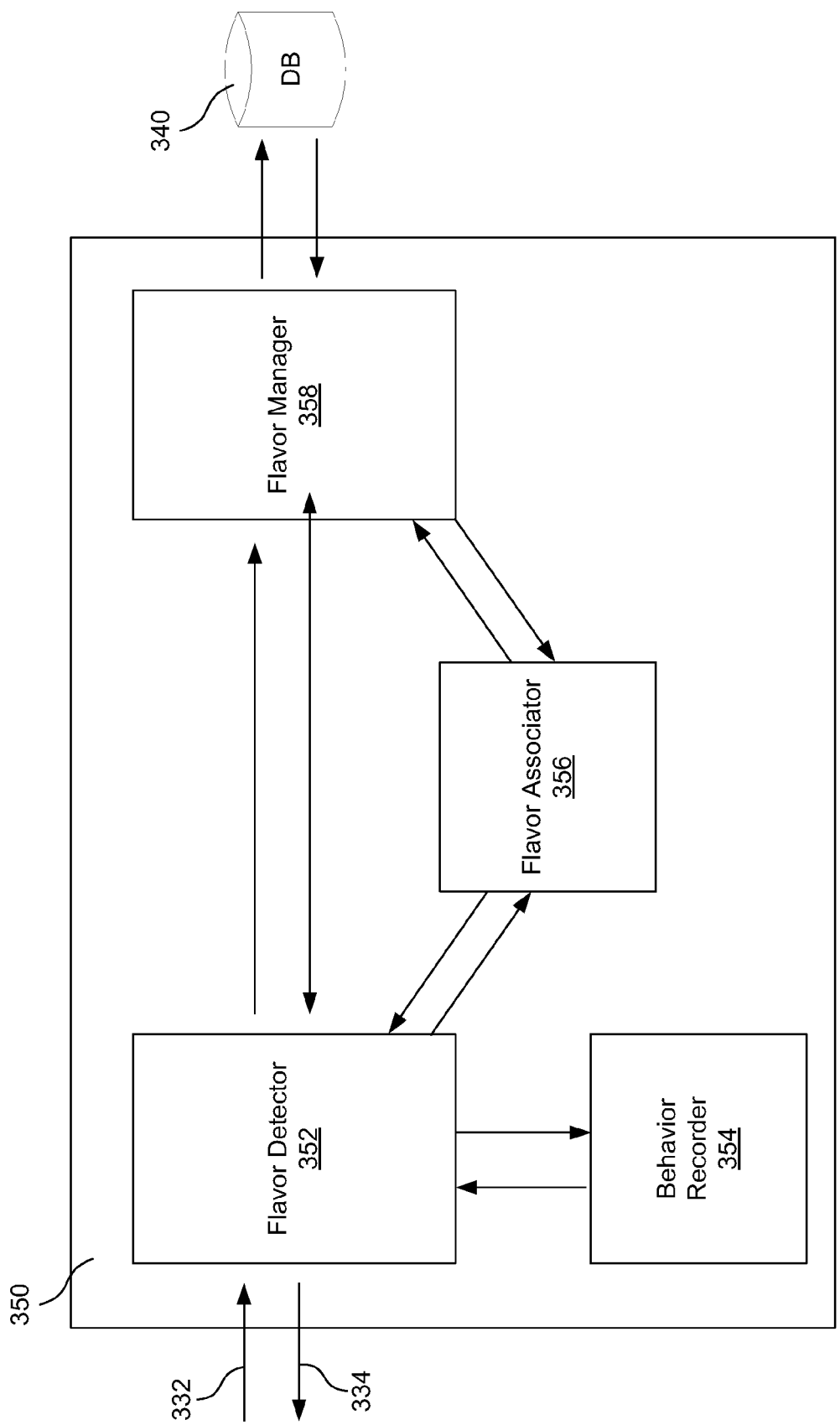
FIG. 6 is a metrics engine in the web portal server shown in FIG. 5, according to one illustrative example of principles described herein.

FIG. 6 illustrates details of an illustrative example of the metrics engine (350) shown in FIG. 5. The metrics engine (350) may comprise a flavor detector (352), a behavior recorder (354) coupled to the flavor detector (352), a flavor manger (358) also coupled to the flavor detector (352) and, a flavor associator (356) coupled to both the flavor detector (352) and the flavor manager (358). The flavor manager (358) is coupled to the repository (340) and can store or retrieve flavor configurations therefrom.

When the engine (FIG. 5, 330) requests a flavor, as indicated by a line (332), the flavor detector (352) requests a flavor from the flavor manager (358) in case a flavor is already associated with a particular user, and the requested flavor is returned from the flavor manager (358) to the flavor detector (352).

The flavor detector (352) identifies the flavor that has been associated with a particular user. To avoid confusion each user may continuously see the same flavor. This association is done with the flavor association component, the flavor associator (356). Different flavors are managed by the flavor manager 358.

In case a flavor has not yet been associated with a particular user, the flavor detector requests a flavor for a current user from the flavor associator (356). The request is submitted together with information for the current user received from the behavior recorder (354). The flavor associator (356) requests a flavor object from the flavor manager (358) and returns the requested flavor to the flavor detector (352). As a result, the flavor detector (352) returns the requested flavor, as indicated by a line (334), to the engine (FIG. 5, 330).

A data processing system, for example web portal server 300, as schematically depicted in FIGS. 3 to 6 suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution.

Input/output or I/O-devices including, but not limited to, keyboards, displays, pointing devices, among others can be coupled to the system (300) either directly of through intervening I/O controllers. Network adapters may also be coupled to the system (300) to enable the data processing system, remote printers, or storage devices through intervening private or public networks. Modems, cable modem and ethernet cards are just a few of the currently available types of network adapters.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer program product for providing a dynamic web portal page in a web portal environment, the computer program product comprising:
    a computer readable storage medium having computer readable program code embodied therewith, the computer readable program code comprising:
        computer readable program code configured to provide, via a server, a content with one or more portlets of the web portal page to a user;
        computer readable program code configured to enter code from the server for identifying user-interface elements in the content of the web portal page;
        computer readable program code configured to enter code from the server into the provided content of the web portal page for monitoring user actions related to the identified user-interface elements in the content of the web portal page;
        computer readable program code configured to automatically re-configure the content of the web portal page according to a user-specific preference extracted from the monitored user actions for the user at a later stage; and
        computer readable program code configured to provide variants of the portal content for different users; and
        computer readable program code configured to select one or more variants of contents in the repository for association with a specific user and then select a most successful variant of the content with respect to that user, while ceasing to use less successful variants;
        in which providing variants of the portal content for different users comprises generating tasks in a workflow process which ask for human interaction of a portal designer.

2. The computer program product of claim 1, further comprising computer readable program code configured to evaluate existing variants of contents for re-configuring automatically the content of the web portal page.

3. The computer program product of claim 1, further comprising computer readable program code configured to generate and maintain a repository of variants of contents of the web portal page.

4. The computer program product of claim 3, further comprising computer readable program code configured to select and associate one or more variants of contents in the repository for a specific user.

5. The computer program product of claim 4, in which the computer readable program code configured to select and associate one or more variants of contents in the repository for a specific user further comprises:
    computer readable program code configured to select a most successful variant of the content, while ceasing to use less successful variants;
    computer readable program code configured to associate a duration of viewing a portlet by the user to presenting of a specific portlet to the user; and
    computer readable program code configured to associate a layout of the content to a specific user.

6. The program product of claim 1, further comprising computer readable program code configured to generate a report on the user actions associated with the web portal page for capturing the user-specific preference.

7. The computer program product of claim 1, wherein said code from the server for identifying user-interface elements in the content of the web portal page attaches an identifier to each user-interface element in the content of the web portal page.

8. The computer program product of claim 1, wherein a variant is selected for a particular user based on user attributes and a rules engine in communication with the server.

9. A system for providing a dynamic web portal page in a web portal environment by modifying the web portal page, the system comprising:
    a server configured to provide a content with at least one portlet of the web portal page to a user, wherein said server comprises at least one processor;
    in which the server enters code into the provided content of the web portal page for identifying user-interface elements in the content of the web portal page;

in which the server enters code into the provided content of the web portal page for monitoring user actions related to the identified user-interface elements in the content of the web portal page;

in which the server re-configures automatically the content of the web portal page according to a user-specific preference extracted from the monitored user actions for the user at a later stage;

in which the server provides variants of the portal content for different users, the server selecting one or more variants of contents in the repository for association with the user and then selecting a most successful variant of the content with respect to the user while ceasing to use less successful variants; and in which providing variants of the portal content for different users comprises generating one or more tasks in a workflow process for human interaction.

10. The system of claim 9, further comprising a browser client configured to provide an output for the monitored user actions on the web portal page for analyzing the user actions on a site-analytic service.

11. The system of claim 9, further comprising a site-analytic service configured to provide a report on the monitored user actions on the web portal page.

12. The system of claim 1, further comprising a repository configured to maintain variants of contents of the web portal page.

13. The system of claim 12, in which the server further selects and associates one or more variants of contents in the repository for a specific user.

14. The system of claim 13, in which selecting and associating one or more variants of contents in the repository for a specific user comprises:

selecting the most successful variant of content permanently and disposing less successful variants;

associating a duration of viewing a portlet by the user to presenting of a specific portlet to the user; and associating a layout of the content to a specific user.

15. A computer program product for providing a dynamic web portal page in a web portal environment, the computer program product comprising:

a computer readable storage medium having computer readable program code embodied therewith, the computer readable program code comprising:

computer readable program code configured to provide, via a server, a content with one or more portlets of the web portal page to a user;

computer readable program code configured to enter code from the server for identifying user-interface elements in the content of the web portal page;

computer readable program code configured to enter code from the server into the provided content of the web portal page for monitoring user actions related to the identified user-interface elements in the content of the web portal page;

computer readable program code configured to automatically re-configure the content of the web portal page according to a user-specific preference extracted from the monitored user actions for the user at a later stage;

computer readable program code configured to select one or more variants of content of the web portal page for association with a specific user, said code further comprising:

computer readable program code configured to select a most successful variant of content, while discarding less successful variants, with respect to that specific user;

in which automatically reconfiguring the content of the web portal page comprises:

if a viewing duration exceeds a threshold, presenting advertising information as a first type of content on said web portal page; and if a viewing duration does not exceed the threshold, presenting a news ticker as a second different type of content on said web portal page.

16. A computer program product for providing a dynamic web portal page in a web portal environment, the computer program product comprising:

a computer readable storage medium having computer readable program code embodied therewith, the computer readable program code comprising:

computer readable program code configured to provide, via a server, a content with one or more portlets of the web portal page to a user;

computer readable program code configured to enter code from the server for identifying user-interface elements in the content of the web portal page;

computer readable program code configured to enter code from the server into the provided content of the web portal page for monitoring user actions related to the identified user-interface elements in the content of the web portal page;

computer readable program code configured to automatically re-configure the content of the web portal page according to a user-specific preference extracted from the monitored user actions for the user at a later stage; and computer readable program code configured to provide variants of the portal content for different users;

in which providing variants of the portal content for different users comprises generating tasks in a workflow process which ask for human interaction of a portal designer; and wherein automatically reconfiguring the content of the web portal page comprises:

if a viewing duration exceeds a threshold, presenting a first type of content; and if a viewing duration does not exceed the threshold presenting a second different type of content on said web portal page.

17. The computer program product of claim 16, wherein automatically reconfiguring the content of the web portal page comprises:

if a viewing duration exceeds the threshold, presenting advertising information on said web portal page; and if a viewing duration does not exceed the threshold presenting a news ticker on said web portal page.

* * * * *